US012601456B2

(12) United States Patent
Giraud

(10) Patent No.: US 12,601,456 B2
(45) Date of Patent: Apr. 14, 2026

(54) HEADLAMP HAVING A VERTICAL CUT-OFF AND EXTENSION FOR A MOTOR VEHICLE

(71) Applicant: VALEO VISION, Bobigny (FR)

(72) Inventor: Sylvain Giraud, Bobigny (FR)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 19/102,452

(22) PCT Filed: Jul. 28, 2023

(86) PCT No.: PCT/EP2023/071095

§ 371 (c)(1),
(2) Date: Feb. 10, 2025

(87) PCT Pub. No.: WO2024/033122

PCT Pub. Date: Feb. 15, 2024

(65) Prior Publication Data

US 2026/0055865 A1 Feb. 26, 2026

(30) Foreign Application Priority Data

Aug. 12, 2022 (FR) ...................................... 2208299

(51) Int. Cl.
*F21S 41/32* (2018.01)
*F21S 41/147* (2018.01)
(Continued)

(52) U.S. Cl.
CPC ........... *F21S 41/321* (2018.01); *F21S 41/147* (2018.01); *F21S 41/26* (2018.01); *F21S 41/365* (2018.01);
(Continued)

(58) Field of Classification Search
CPC ........ F21S 41/147; F21S 41/148; F21S 41/25; F21S 41/26; F21S 41/265; F21S 41/27;
(Continued)

(56) References Cited

U.S. PATENT DOCUMENTS 7,980,742 B2 7/2011 Albou
10,323,816 B2 6/2019 Huber et al.
(Continued)

FOREIGN PATENT DOCUMENTS

EP 2019256 A1 1/2009
EP 3351849 A1 7/2018
(Continued)

OTHER PUBLICATIONS

European Patent Office, International Search Report (with English translation) and Written Opinion of corresponding PCT Application No. PCT/EP2023/071095, dated Nov. 3, 2023.

*Primary Examiner* — Colin J Cattanach
(74) *Attorney, Agent, or Firm* — Valeo Vision

(57) ABSTRACT

The invention relates to a lighting module including a first sub-module with a first light motor and a first optical device that is able to project a first light beam from the first light motor as a first projected light beam, a second sub-module with a second light motor and a second optical device that is able to project a second light beam from the second light motor as a second projected light beam, a mounting plate that is inclined at an angle a with respect to a horizontal plane, about an inclination axis, and in which the first and second light motors are disposed one behind the other, and a plane mirror that is able to reflect the corresponding first or second light beam towards a corresponding projection lens.

16 Claims, 5 Drawing Sheets

(51) Int. Cl.

| | |
|---|---|
| ***F21S 41/148*** | (2018.01) |
| ***F21S 41/25*** | (2018.01) |
| ***F21S 41/26*** | (2018.01) |
| ***F21S 41/265*** | (2018.01) |
| ***F21S 41/27*** | (2018.01) |
| ***F21S 41/36*** | (2018.01) |
| ***F21S 41/365*** | (2018.01) |
| ***F21S 41/39*** | (2018.01) |
| ***F21S 43/14*** | (2018.01) |
| ***F21S 43/30*** | (2018.01) |
| ***F21S 43/31*** | (2018.01) |
| ***F21S 43/37*** | (2018.01) |
| ***F21S 43/40*** | (2018.01) |
| ***F21V 7/00*** | (2006.01) |

(52) U.S. Cl.
CPC ............. *F21S 41/39* (2018.01); *F21S 41/148* (2018.01); *F21S 41/25* (2018.01); *F21S 41/265* (2018.01); *F21S 41/27* (2018.01); *F21S 41/36* (2018.01); *F21S 43/14* (2018.01); *F21S 43/30* (2018.01); *F21S 43/31* (2018.01); *F21S 43/37* (2018.01); *F21S 43/40* (2018.01); *F21S 43/401* (2024.05); *F21V 7/0033* (2013.01)

(58) Field of Classification Search
CPC .......... F21S 41/36; F21S 41/365; F21S 43/14; F21S 43/30; F21S 43/31; F21S 43/37; F21S 43/40; F21S 43/401; F21V 7/0033
See application file for complete search history.

(56) References Cited

U.S. PATENT DOCUMENTS 10,697,607 B2 * 6/2020 Potter ..................... F21S 41/36
11,841,121 B2 12/2023 Zhang

FOREIGN PATENT DOCUMENTS

JP 2010067427 A 3/2010
WO 2020025171 A1 2/2020
WO 2022269006 A1 12/2022

* cited by examiner

HEADLAMP HAVING A VERTICAL CUT-OFF AND EXTENSION FOR A MOTOR VEHICLE

TECHNICAL FIELD

The invention relates to the field of lighting, more particularly to lighting for motor vehicles.

BACKGROUND OF THE INVENTION

The patent document published as WO 2020/025171 A1 discloses lighting modules for motor vehicles, comprising a source of light, a collector with a reflective surface in the form of a cover positioned facing the source of light, and a projection lens which is configured to image the reflective surface lit by the source of light. For this purpose, the projection lens comprises a focal point which is positioned on the reflective surface, in the vicinity of a rear edge of the reflective surface in question, such as to form a clear horizontal cut-off by imaging the rear edge. This document also discloses a lighting module comprising a plurality of sub-modules, such as the one described hereinafter, positioned side-by-side and combined with one another in order to form a cut-off light beam. This lighting module is advantageous in that it makes it possible to combine a plurality of sub-beams with a common projection lens. However, in certain motor vehicle configurations, the space which is available horizontally for the headlamp does not make it possible to use a lighting module of this type. In fact, in certain motor vehicle configurations, the space which is available in a vertical direction, or is inclined in relation to the vertical while remaining mostly vertical, is greater than in the horizontal direction.

SUMMARY OF THE INVENTION

The objective of the invention is to eliminate at least one of the disadvantages of the aforementioned prior art. More particularly, the objective of the invention is to propose a lighting module, advantageously of the cut-off type, which is compact horizontally.

The subject of the invention is a lighting module, in particular for a motor vehicle, comprising an optical axis; a first sub-module comprising a first light motor comprising at least one source of light, a first collector with at least one reflective surface which can reflect rays of light emitted by the at least one source of light of the first light motor in a first reflected light beam, and a first optical device which can project the first reflected light beam in a first projected light beam; and a second sub-module comprising a second light motor comprising at least one source of light, a second collector with at least one reflective surface which can reflect rays of light emitted by the at least one source of light of the second light motor in a second reflected light beam, and a second optical device which can project the second reflected light beam in a second projected light beam; distinguished in that the lighting device comprises a plate with an inclination of an angle α in relation to a horizontal plane, around an axis of inclination which is horizontal and perpendicular to the optical axis; the first and second light motors are positioned on the plate, one behind the other according to a projection of the optical axis on the plate, and each of the first and second optical devices comprises a projection lens and a flat mirror which can return the corresponding first or second reflected light beam towards the corresponding projection lens.

According to an advantageous mode of the invention, the flat mirrors of the first and second optical devices are positioned on the plate.

According to an advantageous mode of the invention, each of the flat mirrors of the first and second optical devices is parallel to the axis of inclination.

According to an advantageous mode of the invention, each of the flat mirrors of the first and second optical devices has an inclination of an angle β in relation to a direction perpendicular to a plane of the plate. Advantageously, the angle β is greater than 0° and/or smaller than 60°.

According to an advantageous mode of the invention, the lenses of the first and second optical devices extend in a main direction with an inclination of an angle γ in relation to the vertical. Advantageously, the angle γ is greater than 0° and/or smaller than 45°.

According to an advantageous mode of the invention, the lenses of the first and second optical devices are adjacent and aligned.

According to an advantageous mode of the invention, the angle α of inclination of the plate is greater than 0° and smaller than 90°. Advantageously, the angle α is greater than 0° and/or smaller than 90°. More advantageously, the angle α is greater than 20°.

According to an advantageous mode of the invention, each of the first and second optical devices is configured to image an area of the at least one reflective surface of the corresponding first or second collector, said area being situated at the rear of the at least one source of light of said first or second collector. "Rear" means in a main direction of propagation of the corresponding first or second reflected light beam.

According to an advantageous mode of the invention, at least one of the first and second projected light beams has an upper horizontal cut-off.

According to an advantageous mode of the invention, the at least one source of light of the first and second light motors is/are positioned on the same plane on the plate. Advantageously, the at least one source of light of the first and second light motors is/are positioned on a front face of the plate.

According to an advantageous mode of the invention, each of the at least one reflective surfaces of the first and second collectors has the form of a cover with an elliptical or parabolic profile directed towards the corresponding source of light of the at least one source of light of the first and second light motors.

According to an advantageous mode of the invention, the lighting module comprises a third sub-module comprising a third light motor positioned on the plate at the rear or front, according to the projection of the optical axis on the plate, of one of the first and second light motors, and comprising at least one source of light, a third collector with at least one reflective surface which can reflect rays of light emitted by the at least one source of light of the third light motor in a third reflected light beam, and a third optical device which can project the third reflected light beam in a third projected light beam, and comprising a projection lens and a flat mirror which can return the third reflected light beam towards the projection lens of the third optical device.

According to an advantageous mode of the invention, the first, second and third light motors are aligned in a main direction corresponding to a projection of the optical axis on the plate.

According to an advantageous mode of the invention, the lighting module comprises a fourth sub-module comprising a fourth light motor positioned on the plate at the rear or the front, according to the projection of the optical axis on the plate, of one of the first, second and third light motors, and comprising at least one source of light, a fourth collector with at least one reflective surface which can reflect rays of light emitted by the at least one source of light of the fourth light motor in a fourth reflected light beam, and a fourth optical device which can project the fourth reflected light beam in a fourth projected beam, and comprising a projection lens and a flat mirror which can return the fourth reflected light beam towards the projection lens of the fourth optical device.

According to an advantageous mode of the invention, the first projected light beam, the second projected light beam, if applicable the third projected light beam, and if applicable the fourth projected light beam form in combination a global projected light beam with an upper horizontal cut-off.

According to the invention, the source of light can be a light-emitting diode, also known as an LED.

The measures according to the invention are advantageous in that they make it possible to provide a high-performance lighting module with a limited horizontal or transverse size. The use of a common plate for the different light motors is particularly advantageous, in that it simplifies the construction and assembly operations of the lighting module. Also, the projection lenses can be aligned in a main direction, which is particularly advantageous for the integration of the lighting module in the silhouette of a motor vehicle. This main direction can be inclined in relation to the vertical towards the rear and/or laterally. This is also particularly advantageous for the integration of the lighting module in the silhouette of a motor vehicle.

At least two of the projection lenses, in particular the one of the first projection device and the one of the second projection device, can be integral in a single piece. This is particularly advantageous for the assembly, in particular when the projection lenses are aligned in a main direction, which, when projected on the plate, is substantially parallel to a main direction of alignment of the collectors on the plate.

The side of the plate which supports the collectors and the sources of light can face the front in the direction of emission of the light beam by said module, and similarly the projection lenses, whether they are assembled in the manner of a single piece or not, can be arranged in front of the plate, with their input faces being oriented towards the plate and their output faces oriented towards the front.

In general, another subject of the invention is a motor vehicle headlamp comprising a lighting module according to the invention. In particular, the headlamp can comprise a housing which is closed by a closure wall, with the lighting module being arranged in the interior of the housing, such that the light beams projected are emitted through the closure wall.

DETAILED DESCRIPTION OF THE INVENTION

In the following description, the orientations expressed in particular by the terms "vertical", "horizontal", "longitudinal", including the feminine and plural forms, as well as by the relative terms such as "above", "below", "front", and "rear", refer to an orientation of the lighting module(s) in an assembled and operational position on a motor vehicle, as illustrated in the figures.

Figure 1:
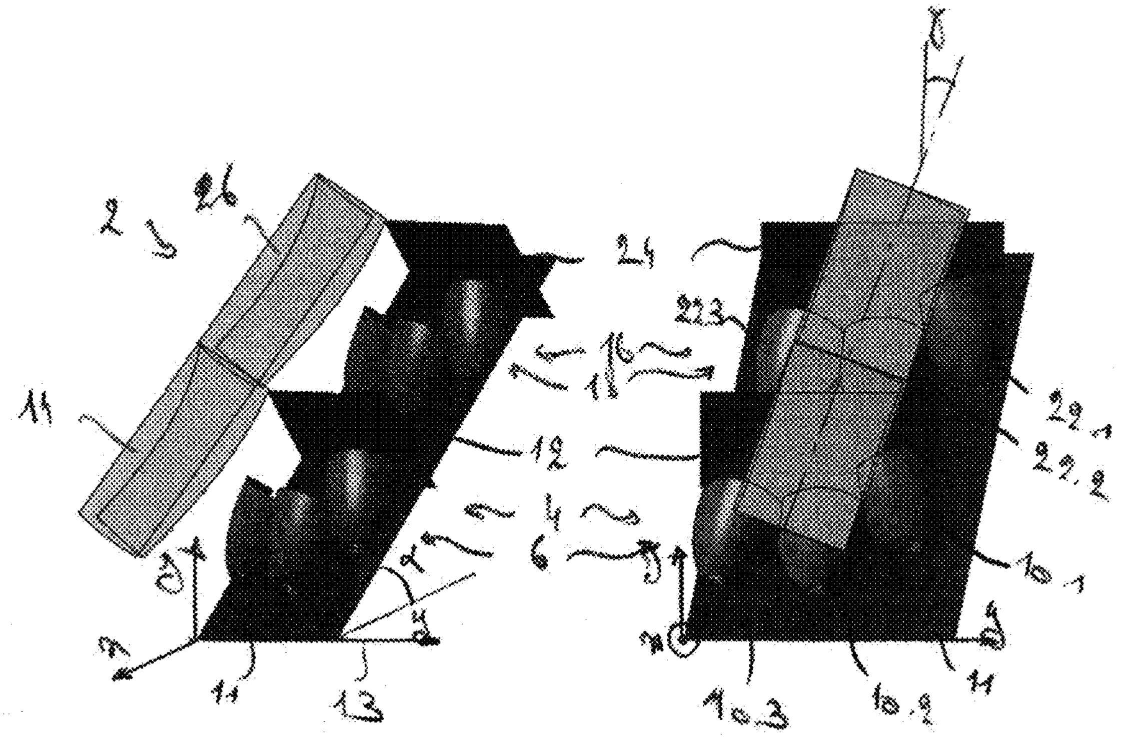
FIG. 1 is a view in perspective and a front view of the main elements of a lighting module according to a first embodiment.
Figure 2:
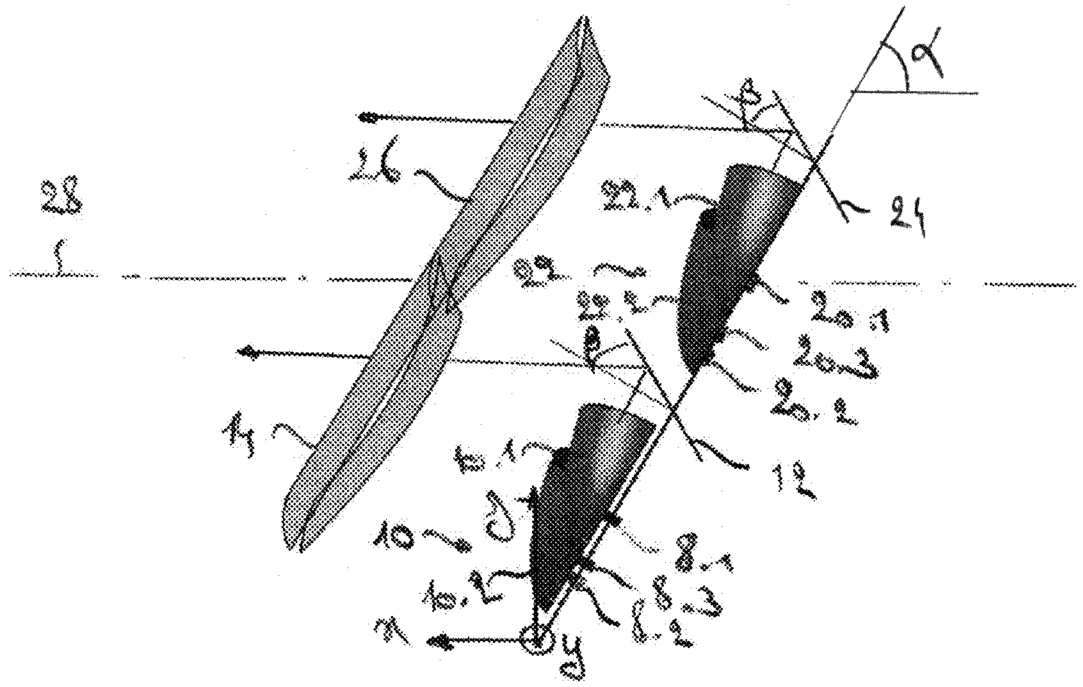
FIG. 2 is a profile view of the lighting module of FIG. 1.
Figure 3:
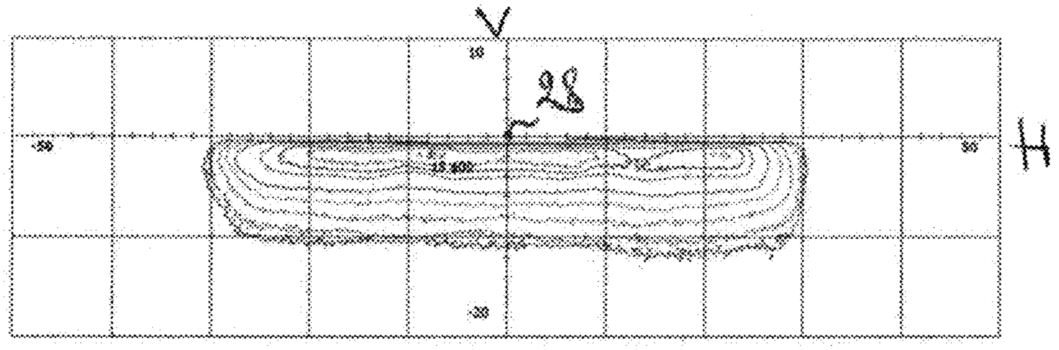
FIG. 3 is a graphic illustration of the image of the light beam produced by the lighting module of FIGS. 1 and 2.

FIGS. 1 to 3 illustrate a lighting module according to a first embodiment of the invention.

FIG. 1 comprises a view in perspective and a front view of a lighting module according to the first embodiment of the invention.

FIG. 2 is a profile view of the lighting module of FIG. 1.

FIGS. 1 and 2 are described hereinafter in combination.

The lighting module 2 comprises a first lighting sub-module 4 consisting substantially of a first light motor 6 configured to produce a first reflected light beam, and of a first optical device 12 and 14 configured to project the first reflected light beam in a first projected light beam.

The first light motor 6 comprises sources of light 8.1, 8.2 and 8.3, and a collector 10 provided with reflective surfaces 10.1, 10.2 and 10.3 positioned side-by-side and each forming an open cavity facing towards the corresponding source of light of the sources of light 8.1, 8.2 and 8.3. Advantageously, a specific source of light is associated with each reflective surface. In this case, the reflective surface 10.1 is positioned facing the source of light 8.1, the reflective surface 10.2 is facing the source of light 8.2, and the reflective surface 10.3 is facing the source of light 8.3. It is understood that the number of source of light/reflective surface pairs can be different from three; it can be one, two, four or even more. The sources of light 8.1, 8.2 and 8.3 are of the light-emitting diode type, and each light up in a space delimited by a plane and in a main direction perpendicular to said plane. The rays of light emitted by the sources of light 8.1, 8.2 and 8.3 are collected by the reflective surfaces 10.1, 10.2 and 10.3, and are reflected towards the first optical device 12 and 14.

The first optical device comprises a flat mirror 12 and a projection lens 14. The flat mirror 12 is positioned facing the first light motor 6, such as to receive its rays, and reflect them towards the projection lens 14. The flat nature of the flat mirror 12 has the effect of not modifying optically the light beams emitted by the first light motor 6. The projection lens 14 has a virtual focal curve or line imaged by the flat mirror 12 which passes via the reflective surfaces 10.1, 10.2 and 10.3, such as to image the reflective surfaces in question lit by the sources of light 8.1, 8.2 and 8.3. Preferably, the virtual focal curve or line is situated on a rear part (in relation to the main direction of propagation of the light beam reflected towards the flat mirror 12) of the reflective surfaces 10.1, 10.2 and 10.3, even more preferably between the sources 8.1, 8.2 and 8.3 and the rear edges of the reflective surfaces 10.1, 10.2 and 10.3. A configuration of this type makes it possible to produce a projected light beam with a clear horizontal cut-off by imaging the rear edges in question.

The lighting module 2 also comprises a second lighting sub-module 16, consisting substantially of a second light motor 18 configured to produce a second reflected light beam, and of a second optical device 24 and 26 configured to project the second reflected light beam in a second projected light beam, in a manner similar to the first lighting sub-module 4 as described above. The second collector 22 comprises the reflective surfaces 22.1, 22.2 and 22.3 in the form of open cavities facing towards the corresponding sources of light 20.1, 20.2 and 20.3. Reference is made to this description of the first lighting sub-module 4.

It can be observed that the first and second lighting sub-modules 6 and 18 are positioned on a plate 11 which is inclined by an angle α around an axis of inclination 13. This plate is horizontal and transverse to the motor vehicle when the lighting module is in the assembled and operational position on the motor vehicle. The axis of inclination 13 corresponds to the axis y of the Cartesian reference system x-y-z. The axis x is parallel to the optical axis 28 of the lighting module 2, as well as to the longitudinal axis of the motor vehicle, when the lighting module is in the assembled and operational position on the motor vehicle. In these conditions, the axis y is horizontal and the axis z is vertical. The inclination of an angle α of the plate 11 is greater than 0° and smaller than 90°. In this first embodiment, the angle α is 60°, on the understanding however that this inclination can be smaller or even greater, depending in particular on the space available on the motor vehicle in order to accommodate the lighting module.

It can also be observed that the first and second lighting sub-modules 6 and 18 are positioned on the plate 11 one behind the other according to a projection of the optical axis 28 on the plate 11, i.e. according to the intersection of a vertical longitudinal plane with the plate 11. This arrangement on the plate 11, combined with its inclination α and the presence of the flat mirrors 12 and 24 on the plate 11, makes it possible to produce the first and second projected light beams superimposed vertically, and combined to form a total projected light beam of the lighting module 2.

It can also be observed that the projection lenses 14 and 26 of the first and second optical devices of the first and second lighting sub-modules 4 and 16 are aligned such as to extend according to a common extension parallel to the plate 11, or inclined in relation to said plate 11 by a small angle, smaller than 20°. With reference to the view from the front (right-hand view) of FIG. 1, the projection lenses 14 and 26 extend in a main direction, illustrated by an axis line, which is inclined by an angle γ in relation to a longitudinal vertical plane in a horizontal projection of said main direction, and also in relation to the optical axis 28 (FIG. 2) in a vertical projection of said main direction. In this first embodiment the angle γ is 20°. It is advantageously greater than 0° and smaller than 45°. This inclination is advantageous, in that it assists the integration of the lighting module 2 in the motor vehicle, where, at least on the outer surface of the motor vehicle, the space reserved for the lighting module can have an inclination of this type, in particular for reasons of style of said motor vehicle. The inclination of the main direction of the projection lenses 14 and 26 is made possible by corresponding offsetting of the lighting sub-modules 4 and 16, in particular of the first and second light motors 6 and 18 of the flat mirrors 12 and 24 according to the axis of inclination 13 or the axis y.

The flat mirrors 12 and 24 are parallel to the axis of inclination 13, and therefore to the direction y. They each form an inclination of an angle β in relation to a direction perpendicular to the plate 11. In this first embodiment, the angle β is approximately 30°. It is advantageously greater than 0° and smaller than 60°. The angle β is all the larger, the larger the angle α is, and conversely.

FIG. 3 illustrates the total projected light beam of the lighting module 2, formed by the superimposition of the first and second projected light beams of the first and second lighting sub-modules 4 and 16 (FIGS. 1 and 2). The curves are curves with the same illuminance (isolux) according to a Cartesian reference system H-V, where H is a horizontal axis and V is a vertical axis, with the optical axis 28 of the lighting module passing via the intersection of said axes H and V. It can be observed that the global light beam has a horizontal upper cut-off slightly below the axis H. It can thus involve a motor vehicle lighting function with cut-off commonly designated as "low beam".

Figure 4:
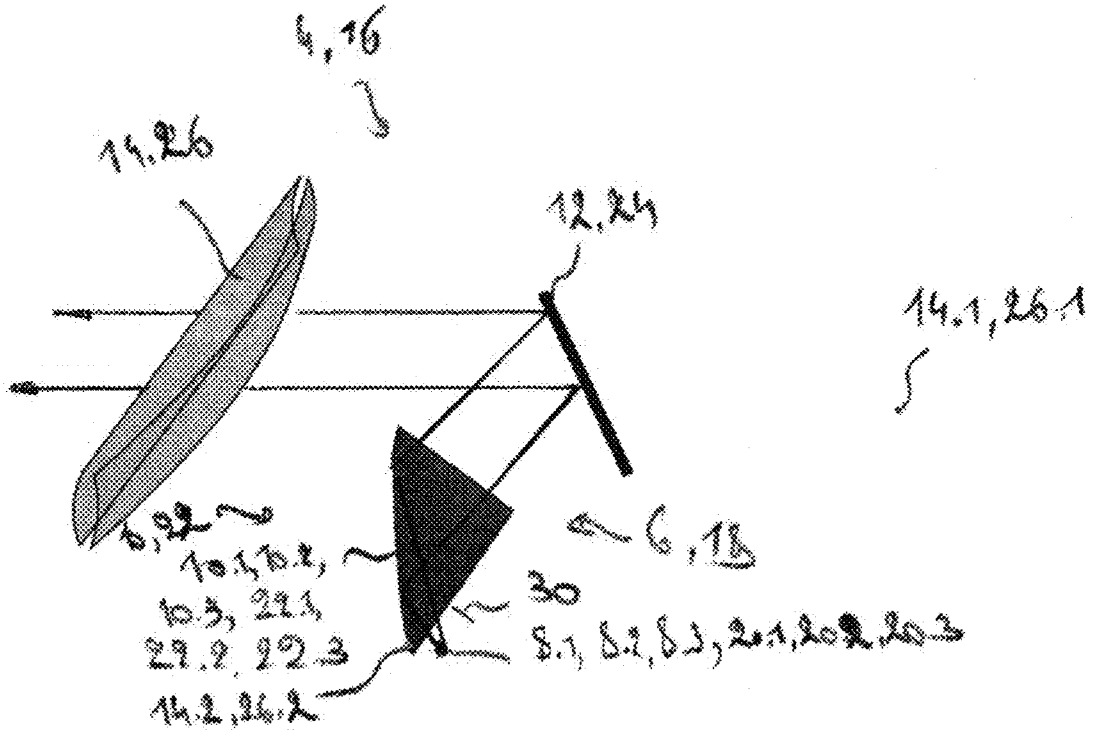
FIG. 4 is a profile view of one of the lighting sub-modules of the lighting module of FIGS. 1 and 2, illustrating the principle of the invention.

FIG. 4 illustrates the operating principle of each of the two lighting sub-modules 4 and 16 of the lighting module 2 of FIGS. 1 and 2.

For purposes of clarity of description, a single reflective surface 10.1, 10.2, 10.3, 22.1, 22.2 or 22.3 in the form of an open cavity is represented. Thus, a single source of light 8.1, 8.2, 8.3, 20.1, 20.2 or 20.3, associated with the reflective surface represented, is shown.

The projection lens 14 or 26 has a focal point 14.1 or 26.1 situated at the rear of the flat mirror 12 or 24. As a result of the effect of the flat mirror 12 or 24, the projection lens 14 or 26 has a virtual focal point 14.2 or 26.2 situated on the reflective surface 10.1, 10.2, 10.3, 22.1, 22.2 or 22.3, advantageously at a rear edge of said reflective surface. The projection lens 14 or 26 is consequently configured to image the reflective surface lit by the associated source of light, in particular the portion of the reflective surface in question where the virtual focal point 14.2 or 26.2 is situated.

The reflective surface 10.1, 10.2, 10.3, 22.1, 22.2 or 22.3 advantageously has a profile of the elliptical or parabolic type. It is advantageously a surface of revolution around an axis parallel to an optical axis of the light motor 6 or 18. Alternatively, it can be a free-form surface, or a swept surface, or an asymmetrical surface. It can also be multiple, such as to comprise a plurality of sectors. The collector 10 or 22 in the form of a shell or cover is advantageously made of materials with good resistance to heat, for example glass or synthetic polymers such as polycarbonate PC or polyetherimide PEI. The expression "parabolic type" applies in general to reflectors, the surface of which has a single focal point, i.e. an area of convergence of the rays of light, such that the rays of light emitted by a source of light placed at this area of convergence are projected over a long distance after reflection on the surface. "Projected over a long distance" means that these rays of light do not converge towards an area situated at 10 times at least the dimensions of the reflector. In other words, the reflected rays do not converge towards an area of convergence, or, if they converge, this area of convergence is situated at a distance of 10 times or more than the dimensions of the reflector. A surface of a parabolic type thus can or need not have parabolic portions. A reflector with a surface of this type is generally used alone in order to create a light beam. Alternatively, it can be used as a projection surface associated with a reflector of an elliptical type. In this case, the source of light of the reflector of a parabolic type is the area of convergence of the rays reflected by the reflector of an elliptical type.

The source of light 8.1, 8.2, 8.3, 20.1, 20.2 or 20.3 is positioned at a focal point of the reflective surface, such that its rays are collected and reflected along the optical axis of the light motor 6 or 18. At least some of these reflected rays have angles of inclination on a plane which is vertical in relation to said axis which are 25° or less, preferably 10° or less, such as to be within so-called Gaussian conditions, thus making it possible to obtain a stigmatism, i.e. neatness of the projected image. These are rays which are advantageously reflected by the rear part of the reflective surface.

Figure 5:
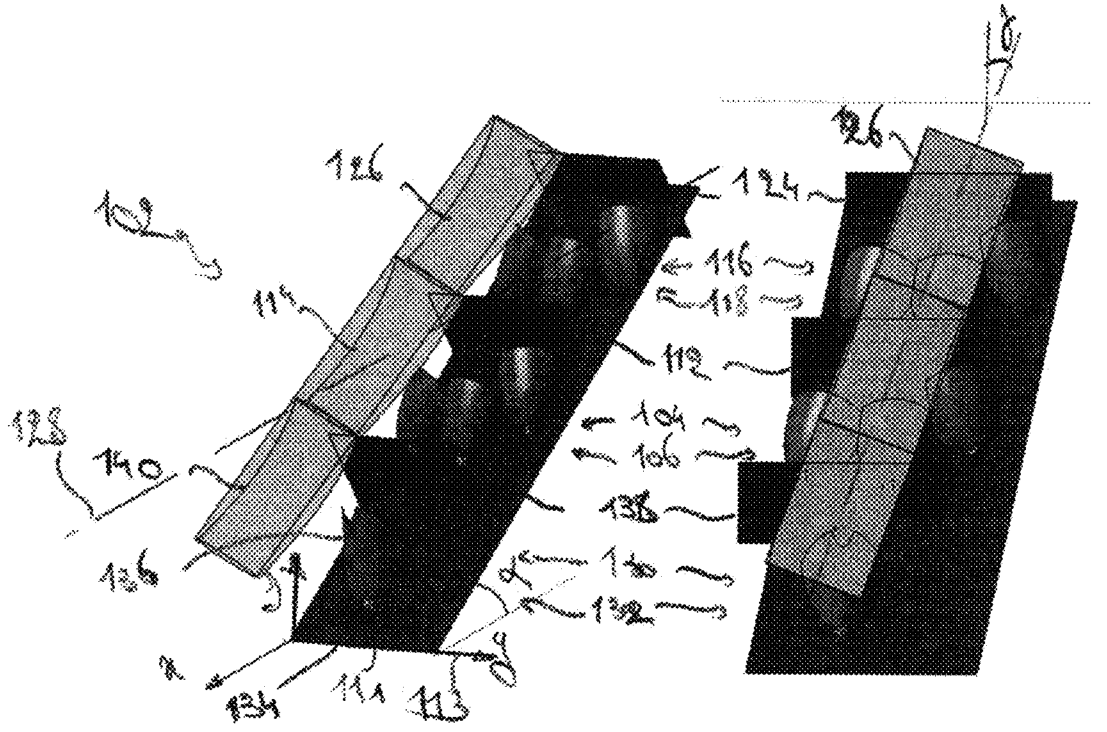
FIG. 5 is a view in perspective and a front view of the main elements of a lighting module according to a second embodiment.
Figure 6:
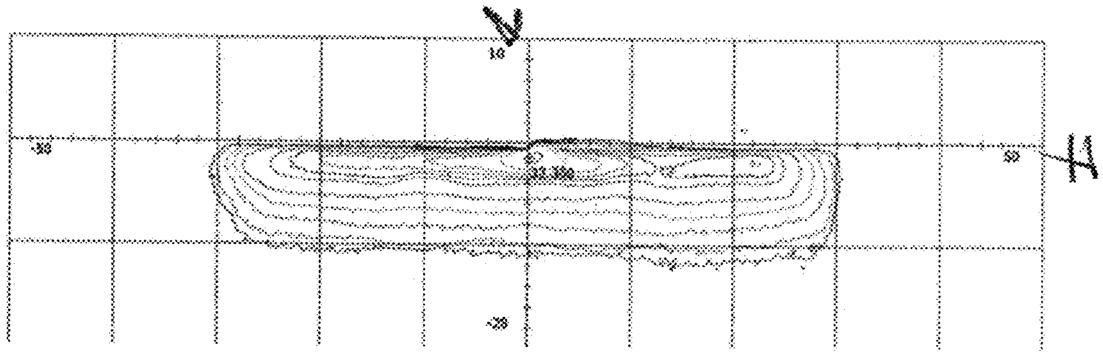
FIG. 6 is a graphic illustration of the image of the light beam produced by the lighting module of FIG. 5.

FIGS. 5 and 6 illustrate a lighting module according to a second embodiment of the invention. The reference numerals of the first embodiment are used to designate elements which are identical or similar, these numbers being however increased by 100. Reference is also made to the description of these elements in the first embodiment. Specific numerals between 100 and 200 are used to designate the elements which are specific to this embodiment.

The lighting module 102 of the second embodiment is distinguished from that of the first embodiment substantially in that it comprises a third lighting sub-module 130 comprising a third light motor 132 and a third optical device 138 and 140. The third light motor 132 in this case comprises a single source of light 134 and a collector with a single reflective surface 136 in the form of an open cavity directed towards the source of light 134. The third optical device is similar to the first and second optical devices 112, 114 and 124, 126. It is configured to image the reflective surface 136 lit by the source of light 134, and to form a third projected light beam. This beam is distinguished in that it extends less horizontally and vertically than the first and second projected light beams. This reduced horizontal extension is obtained by using only a single reflective surface, whereas each of the first and second projected light beams uses three reflective surfaces positioned side-by-side. The reduced vertical extension is obtained by providing a cut-out at the front edge of the reflective surface 136 of the collector of the third light motor 132. Also, the rear edge has a projection (not shown), the image of which that is projected by the projection lens 140 forms an upper horizontal cut-off with a corresponding projection.

FIG. 6 illustrates the total projected light beam of the lighting module 102, formed by the superimposition of the first, second and third projected light beams of the first, second and third lighting sub-modules 104, 116 and 130 (FIG. 5). The curves are curves with the same illuminance (isolux) according to a Cartesian reference system H-V, where H is a horizontal axis and V is a vertical axis, with the optical axis of the lighting module passing via the intersection of said axes H and V.

The horizontal cut-off with a projection at the intersection of the axes H and V, formed by the third lighting sub-module 130 as described above, can clearly be seen. This projection is centered on the optical axis of the lighting module 102.

Figure 7:
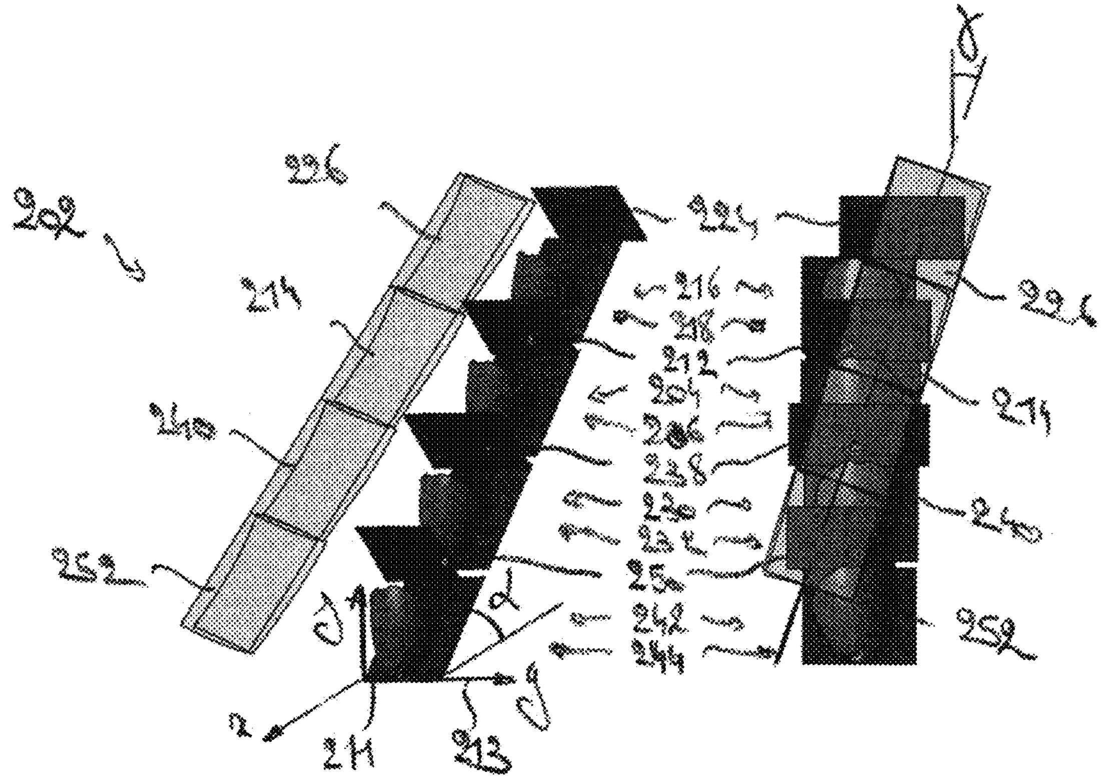
FIG. 7 is a view in perspective and a front view of the main elements of a lighting module according to a third embodiment.
Figure 8:
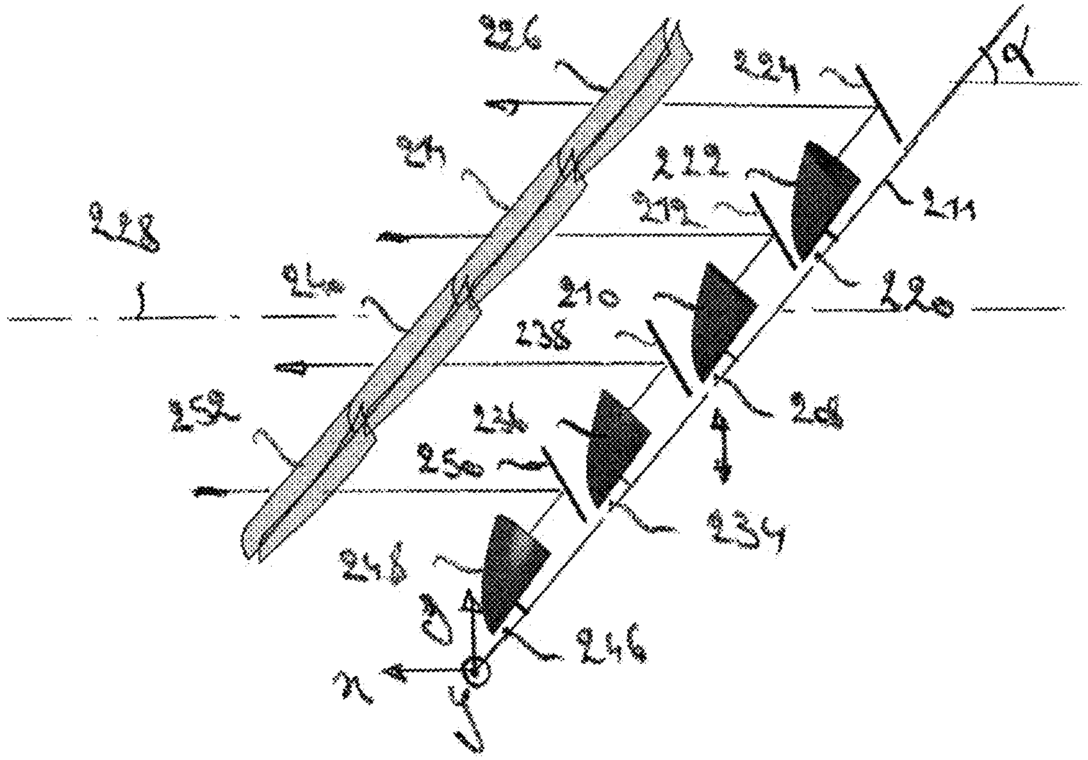
FIG. 8 is a profile view of the lighting module of FIG. 7.
Figure 9:
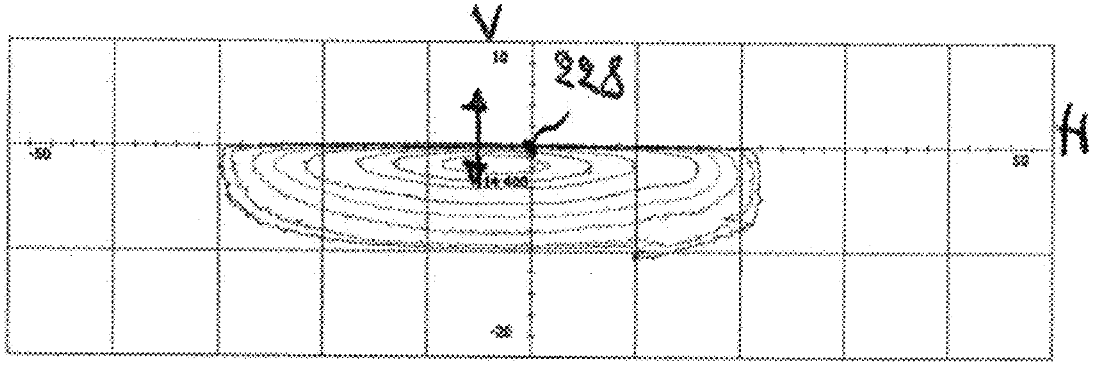
FIG. 9 is a graphic illustration of the image of the light beam produced by the lighting module of FIGS. 7 and 8.

FIG. 7 to 9 illustrate a lighting module according to a third embodiment of the invention. The reference numerals of the second embodiment are used to designate elements which are identical or similar, these numerals being however increased by 100. Reference is also made to the description of these elements in the first and second embodiments. Specific numerals between 200 and 300 are used to designate the elements which are specific to this embodiment.

FIG. 7 comprises a view in perspective and a front view of a lighting module according to the first embodiment of the invention.

FIG. 8 is a profile view of the lighting module of FIG. 7.

FIGS. 7 and 8 are described hereinafter in combination.

The lighting module 202 of the second embodiment is distinguished from that of the first embodiment substantially in that it comprises a fourth lighting sub-module 242 comprising a fourth light motor 244 and a fourth optical device 250 and 252. Also, the collector of each of the first, second, third and fourth light motors 206, 218, 232, 244 comprises a single reflective surface 210, 222, 236 and 248. Similarly, each of the first, second, third and fourth light motors 206, 218, 232, 244 comprises a single source of light 208, 220, 234 and 246.

FIG. 9 illustrates the total projected light beam of the lighting module 202, formed by the superimposition of the first, second, third and fourth projected light beams of the first, second, third and fourth lighting sub-modules 204, 216, 230 and 242 (FIG. 7). The curves are curves with the same illuminance (isolux) according to a Cartesian reference system H-V, where H is a horizontal axis and V is a vertical axis, with the optical axis of the lighting module passing via the intersection of said axes H and V. A horizontal cut-off without a projection at the intersection of the axes H and V can clearly be seen.

In relation to FIGS. 8 and 9, it should be noted that a generally vertical displacement of the plate 211, equipped with the first, second, third and fourth lighting sub-modules, in relation to the projection lenses, makes it possible to displace vertically the total projected light beam of the lighting module 202, i.e. along the axis V in FIG. 9. Displacement upwards of the plate 211 with the lighting sub-modules in relation to the projection lenses 214, 226, 240 and 252 will also displace the total projected light beam upwards, and vice versa.

These displacements are schematized by a two-way vertical arrow in each of FIGS. 8 and 9.

It should be noted that this phenomenon also applies to the other embodiments.

What is claimed is:

1. A lighting module for a motor vehicle, the lighting module comprising:

- an optical axis;
- a first sub-module including:
  - a first light motor including at least one source of light, a first collector with at least one reflective surface which can reflect rays of light emitted by the at least one source of light of the first light motor in a first reflected light beam, and
  - a first optical device which can project the first reflected light beam in a first projected light beam; and
- a second sub-module including:
  - a second light motor including at least one source of light, a second collector with at least one reflective surface which can reflect rays of light emitted by the at least one source of light of the second light motor in a second reflected light beam, and
  - a second optical device which can project the second reflected light beam in a second projected light beam;
- a plate with an inclination of an angle $\alpha$ in relation to a horizontal plane, around an axis of inclination which is horizontal and perpendicular to the optical axis;
- the first and second light motors are positioned on the plate, one behind the other according to a projection of the optical axis on the plate, and
- each of the first and second optical devices includes a projection lens and a flat mirror which can return the corresponding first or second reflected light beam towards the corresponding projection lens.

2. The lighting module as claimed in claim 1, wherein the flat mirrors of the first and second optical devices are positioned on the plate.

3. The lighting module as claimed in claim 1, wherein each of the flat mirrors of the first and second optical devices is parallel to the axis of inclination.

4. The lighting module as claimed in claim 1, wherein each of the flat mirrors of the first and second optical devices has an inclination of an angle β in relation to a direction perpendicular to a plane of the plate.

5. The lighting module as claimed in claim 1, wherein the projection lenses of the first and second optical devices extend in a main direction with an inclination of an angle γ in relation to a vertical.

6. The lighting module as claimed in claim 1, wherein the projection lenses of the first and second optical devices are adjacent and aligned.

7. The lighting module as claimed in claim 1, wherein the angle of inclination α of the plate is greater than 0° and smaller than 90°.

8. The lighting module as claimed in claim 1, wherein each of the first and second optical devices is configured to image an area of the at least one reflective surface of the corresponding first or second collector, the area being situated at the rear of the at least one source of light of the first or second collector.

9. The lighting module as claimed in claim 1, wherein at least one of the first and second projected beams has an upper horizontal cut-off.

10. The lighting module as claimed in claim 1, wherein the at least one source of light of the first and second light motors is/are positioned on the same plane on the plate.

11. The lighting module as claimed in claim 1, wherein each of the at least one reflective surfaces of the first and second collectors has the form of a cover with an elliptical or parabolic profile directed towards the corresponding source of light of the at least one source of light of the first and second light motors.

12. The lighting module as claimed in claim 1, further comprising a third sub-module including:

a third light motor positioned on the plate at the rear or front, according to the projection of the optical axis on the plate, of one of the first and second light motors, and including at least one source of light, a third collector with at least one reflective surface which can reflect rays of light emitted by the at least one source of light of the third light motor in a third reflected light beam, and a third optical device which can project the third reflected light beam in a third projected light beam, and including a projection lens and a flat mirror which can return the third reflected light beam towards the projection lens of the third optical device.

13. The lighting module as claimed in claim 12, wherein the first, second and third light motors are aligned in a main direction corresponding to a projection of the optical axis on the plate.

14. The lighting module as claimed in claim 12, further comprising a fourth sub-module including:

a fourth light motor positioned on the plate at the rear or the front, according to the projection of the optical axis on the plate, of one of the first, second and third light motors, and including at least one source of light, a fourth collector with at least one reflective surface which can reflect rays of light emitted by the at least one source of light of the fourth light motor in a fourth reflected light beam, and a fourth optical device which can project the fourth reflected light beam in a fourth projected beam, and including a projection lens and a flat mirror which can return the fourth reflected light beam towards the projection lens of the fourth optical device.

15. The lighting module as claimed in claim 1, wherein the first projected light beam and the second projected light beam form in combination a global projected light beam with an upper horizontal cut-off.

16. A motor vehicle headlamp comprising a lighting module with the lighting module including an optical axis, a first sub-module including a first light motor including at least one source of light, a first collector with at least one reflective surface which can reflect rays of light emitted by the at least one source of light of the first light motor in a first reflected light beam, and a first optical device which can project the first reflected light beam in a first projected light beam, and a second sub-module including a second light motor including at least one source of light, a second collector with at least one reflective surface which can reflect rays of light emitted by the at least one source of light of the second light motor in a second reflected light beam, and a second optical device which can project the second reflected light beam in a second projected light beam, a plate with an inclination of an angle α in relation to a horizontal plane, around an axis of inclination which is horizontal and perpendicular to the optical axis, the first and second light motors are positioned on the plate, one behind the other according to a projection of the optical axis on the plate, and each of the first and second optical devices includes a projection lens and a flat mirror which can return the corresponding first or second reflected light beam towards the corresponding projection lens.

* * * * *